United States Patent [19]

Olsson

[11] Patent Number: 5,084,663
[45] Date of Patent: Jan. 28, 1992

[54] CONTROL ARRANGEMENT FOR A RELUCTANCE MOTOR

[75] Inventor: Lars-Erik R. Olsson, Svedala, Sweden

[73] Assignee: Aktiebolaget Electrolux, Stockholm, Sweden

[21] Appl. No.: 576,472
[22] PCT Filed: Jan. 24, 1990
[86] PCT No.: PCT/SE90/00048
 § 371 Date: Oct. 1, 1990
 § 102(e) Date: Oct. 1, 1990
[87] PCT Pub. No.: WO90/09700
 PCT Pub. Date: Aug. 23, 1990

[30] Foreign Application Priority Data

Feb. 7, 1989 [SE] Sweden .................................. 8900408

[51] Int. Cl.⁵ ............................................. G05B 19/40
[52] U.S. Cl. ..................................... 318/701; 318/696; 318/811; 318/599; 318/685
[58] Field of Search ............... 318/685, 696, 701, 811, 318/599

[56] References Cited

U.S. PATENT DOCUMENTS

3,679,953 7/1972 Bedford ............................... 318/138
4,684,867 8/1987 Miller et al. ......................... 318/701
4,746,843 5/1988 Taenzer .......................... 318/811 X
4,760,316 7/1988 Hedlund ........................ 318/599 X
4,990,843 2/1991 Moren et al. ....................... 318/701

Primary Examiner—William M. Shoop, Jr.
Assistant Examiner—Saul M. Bergmann
Attorney, Agent, or Firm—Pearne, Gordon, McCoy & Granger

[57] ABSTRACT

A control arrangement for a reluctance motor, comprising stator poles (11a, b; 12a, b) provided with windings (13a, b; 14a, b) which cooperate in pairs, and a rotor (15) made of soft magnetic material and having at least two poles (16a, b; 17a, b) disposed diametrically opposite each other. The motor is controlled by a sensor (X1) which each time a rotor pole is about to move in over a stator pole generates a ramp of a first polarity and when the rotor pole leaves the stator pole generates a ramp of a second polarity, opposite said first polarity. Electronic switching means (33, 34; 35, 36) are provided which in dependence on the first ramp apply voltage to the windings of one (12a, b) of the stator pole pairs and in dependence on the second ramp disconnect the voltage to said stator pole pair (12a, b) and apply voltage to the stator pole pair to follow. First means (28, 30) are provided to generate, in dependence on said parameter, a signal which causes a presetting of the time of voltage application to the windings of the respective stator pole pair, said presetting increasing as the current increases.

4 Claims, 8 Drawing Sheets

CONTROL ARRANGEMENT FOR A RELUCTANCE MOTOR

The present invention relates to a control arrangement for a reluctance motor of the kind indicated in the preamble of appending claim 1.

In particular, the arrangement is intended to be used in connection with a reluctance motor having a four-pole stator and a two-pole rotor and being described more in detail in the appending description of a preferred embodiment. In the embodiment chosen, the motor comprises a stator in which the four poles are arranged so as to form a cross. The rotor is shaped such that its poles are being disposed diametrically opposite each other. In the usual way, the stator poles have windings while the rotor is made of soft-magnetic material, without any windings. The rotor poles have got a shape and extend so as to have one part of it completely covering a stator pole while, at the same time, having another part of it filling up the space to the adjacent stator pole, as seen in the direction of rotation. The latter part of the rotor pole has a greater air gap than the first-mentioned part.

In the 4/2-pole motor, referred to, the stator poles are being activated in pairs twice during each revolution. The stator pole windings thus activated create a magnetic field which is directed in parallel to one or the other of the pole pairs. When the magnetic field is set up, the rotor is forced to take the position where the magnetic resistance, or reluctance, has its minimum value in the magnetic circuit. In this minimum reluctance position the rotor is disposed such that its poles coincide with the activated stator poles. When the rotor poles are aligning with the stator poles a sensor emits to a control arrangement for the motor a signal operating it to throw over and to activate the other pair of stator poles. When the rotor pole is aligned with the poles of a stator pole pair, that part of the rotor pole having the greater air gap, called the starting pole, is disposed such that it can create torque with one of the poles of the other stator pole pair. The function of the said starting pole is to ensure torque for driving of the rotor in all positions of the same. However, the starting pole also brings with it that the motor can only rotate in a single direction.

One problem related to reluctance motors of the kind referred to is that at higher motor speeds the magnetic field will not have sufficient time to build up to generate the required torque. The solution to the problem is to activate the stator windings prior to the sensor indicating the alignment of the rotor and stator poles.

The problem at high motor speeds, referred to, is primarily connected with the desire of providing sufficient torque when, at the same time, the motor is highly loaded and rotates at a high speed. The object of the invention is to solve this problem and to provide an arrangement which in dependence on the actual torque demand controls the time of preactivation of a pair of stator poles. The object is achieved by an arrangement in accordance with appending claim 1. Preferred embodiments appear from the sub-claims connected therewith.

The invention will now be described in detail in connection with an embodiment, with reference to the enclosed drawings, in which FIG. 1 schematically shows a reluctance motor having four stator poles and two rotor poles, FIG. 2 schematically shows the directions of magnetic flux in the motor according to FIG. 1.

In the embodiment to be described, by putting together FIGS. 4a, 5, 6, 8, 10, 11, 12a and 12b, a complete circuit diagram will be given of a reluctance motor having four stator poles and two rotor poles. A general, brief description of the many function blocks will be given with reference i.a. to FIG. 3. In addition, a more detailed description will be given of those of the function blocks which are related to the pre-activation and -inactivation, respectively, of the stator pole windings.

Figure 1:
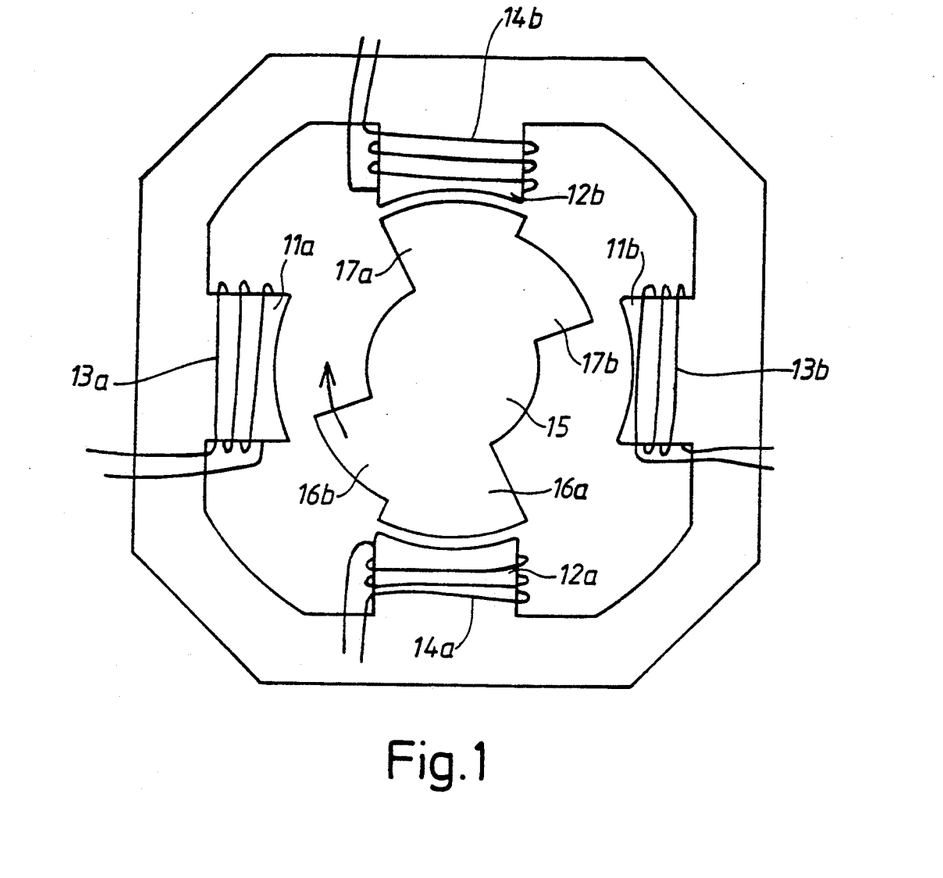

The motor with which the invention is to be used is schematically shown in FIG. 1. A stator 10 has four poles 11a, b, 12a, b, arranged to form a cross. The poles are provided with windings 13a, b; 14a, b and which are connected to operate in pairs generating magnetic fields which cooperate. A rotor 15 is arranged to rotate in the space between the stator poles and is provided with two poles 16a, b; 17a, b which are disposed in diametrically opposite positions. The pole parts 16a, 17a have a peripheral extension which equals the corresponding extension of the stator poles. The pole parts 16b, 17b have an extension which, when the pole parts 16a, 17a are situated just opposite the poles of one stator pole pair, fills the space leading to the poles of the other stator pole pair, as seen in the direction of rotation. In addition, the pole parts 16b, 17b have a greater air gap with respect to the stator poles and will be referred to as starting poles in the following. These starting poles ensure that torque can be generated in all positions of the rotor. However, as indicated above, this shape of the rotor brings with it that the rotor can rotate in a single direction only.

Figure 2:
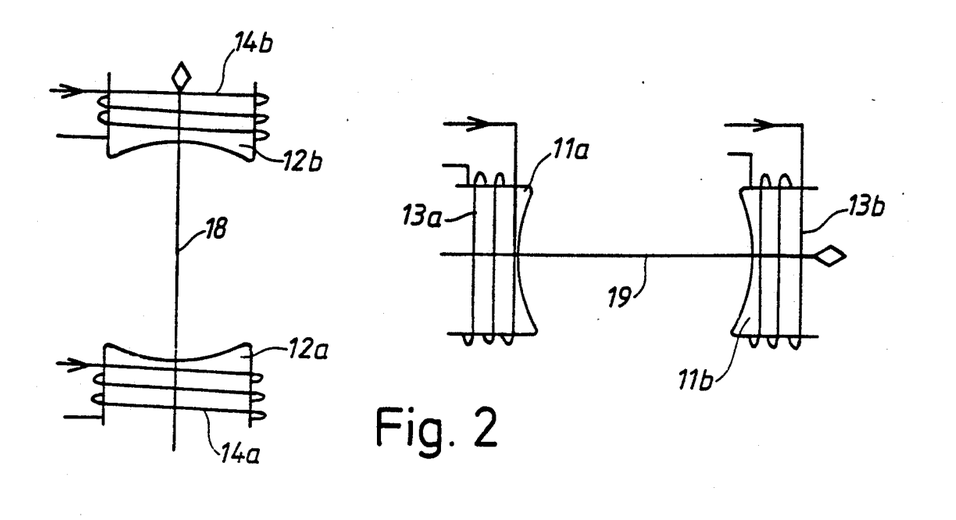

In order to turn the rotor the stator pole pairs 11a, b and 12a, b, respectively, are magnetized alternatly and thereby the rotor poles will alternatly align with the respective rotor pole pair. In FIG. 2, by means of flux arrows 18, 19 the directions of flux are schematically shown as caused by the stator pole pairs 12a, b and 11a, b, respectively, being magnetized. In order for the rotor to complete one revolution it is not necessary to alternately change the direction of magnetization. Accordingly, the direction of the magnetic field in the respective stator pole pair is immaterial which simplifies the construction of the control arrangement for said motor. The control arrangement is shown in the form of a block diagram in FIG. 3 and the various function blocks will now be described briefly. In the diagram the motor is represented by a block 20. A rotor position sensor is provided for indicating the rotor aligning with either of the stator pole pairs. In principle, the sensor generates a signal which controls the switching from one stator pole pair to the other. The sensor is being found in a block 21. The sensor is of the kind generating a square wave voltage but gives information only about the aligning of rotor and stator poles. In order to get a picture of the instantaneous position of the rotor in the intermediate areas of the rotational movement, the sensor signal is supplied to a block 22 in which a sawtooth shaped voltage is generated. This voltage is applied to a block 23 in which is generated a speed signal constituting a measure of the actual speed of the rotor.

Figure 3:
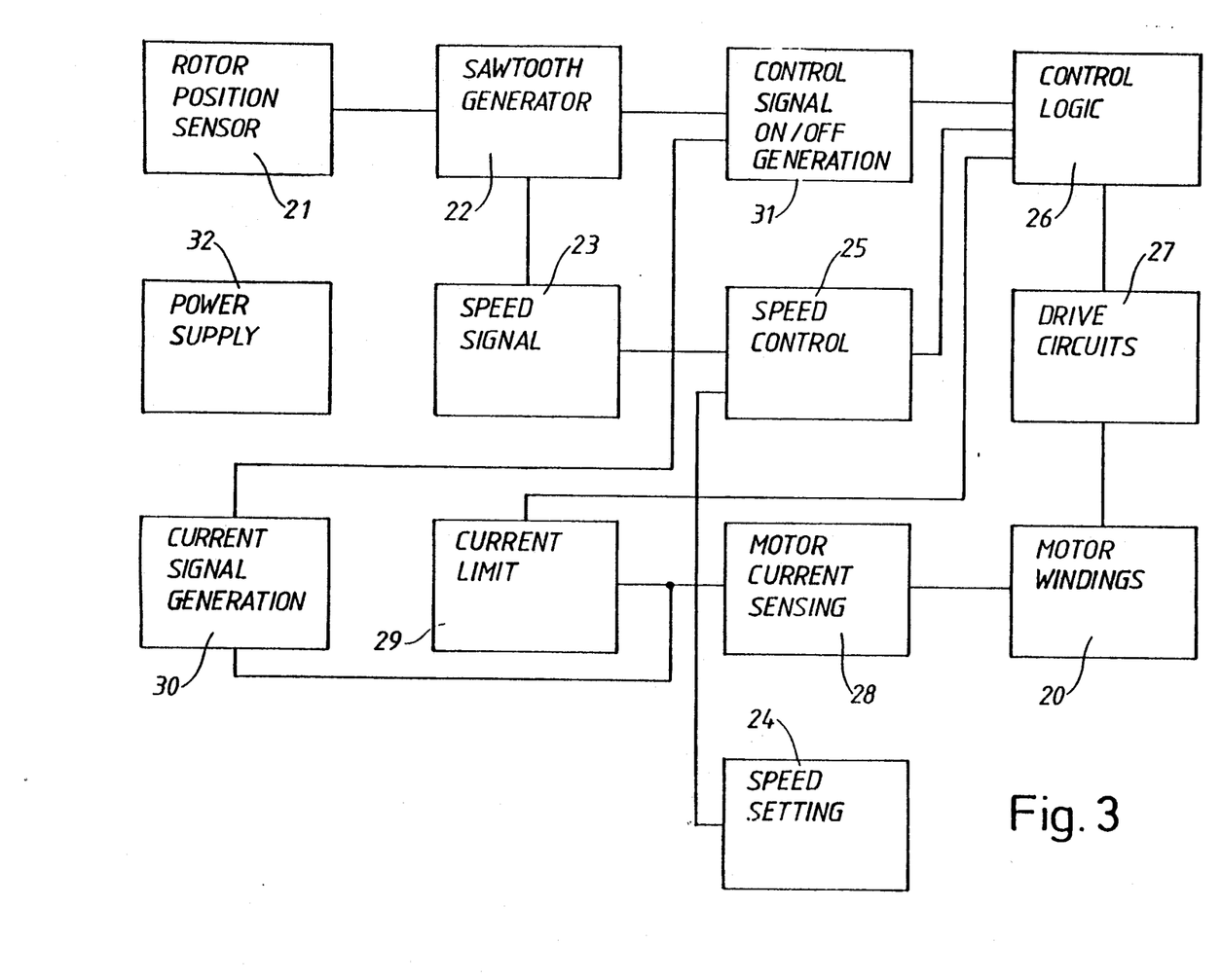
FIG. 3 is a block diagram of a control arrangement for the motor of FIG. 1, FIG. 4a,b,c, are identical circuit diagrams for different operating situations concerning the part of the control arrangement supplying current to the stator pole windings of the motor.

In order to make possible the setting and control of the desired speed of the motor, a block 24 is provided, representing a speed selector, as well as a block 25 in which a control signal is created. To this end, in the block 25 a quantity from the block 23, representing the actual speed, is compared with a quantity from the block 24, representing the desired speed. The control signal from the block 25 is applied to a block 26 comprising logic circuits. Control signals from the block 26 are conducted to drive circuits in a block 27 which in turn provide drive voltage to the motor windings in the block 20.

The current through the motor windings is being sensed in a block 28 and a current parameter is generated which is conducted to a block 29 for the generation of a current limit value to be applied to the logic block 26. The current parameter from the block 28 is also conducted to a block 30, in which a quantity is generated which represents the instantanous magnitude of the current. This current dependent quantity is led to a block 31 in which control signals are generated for the control logic in the block 26. In the block 31 the magnitude of the pre-activation of a stator pole pair is determined with regard to the instantaneous magnitude of the current. The complete circuit diagram also comprises a power supply unit represented in FIG. 3 by a block 32.

Figure 4A:
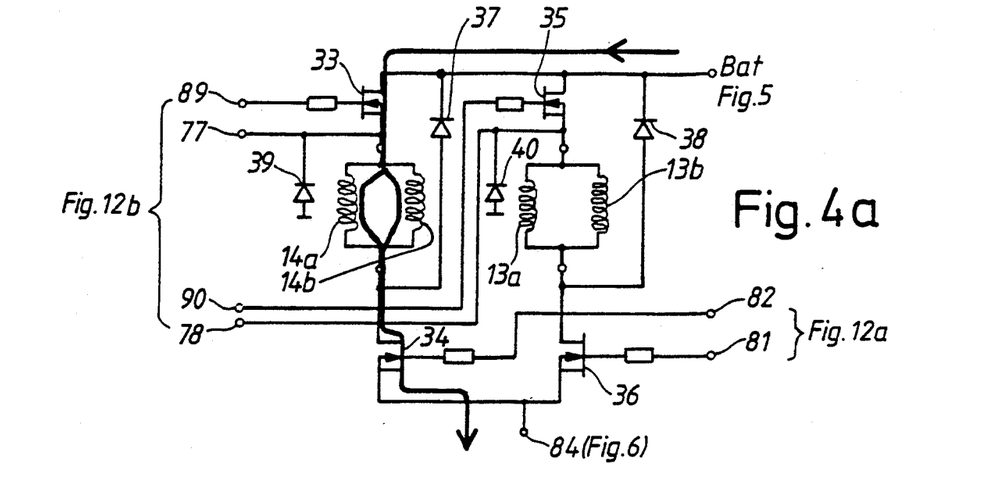
Figure 4B:
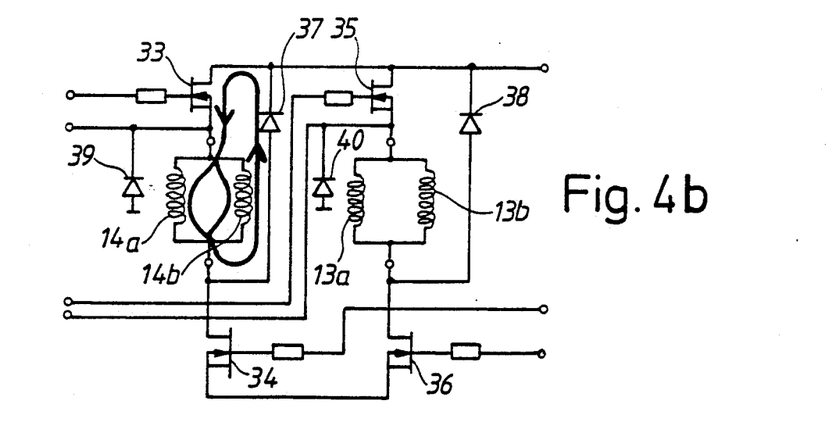
Figure 4C:
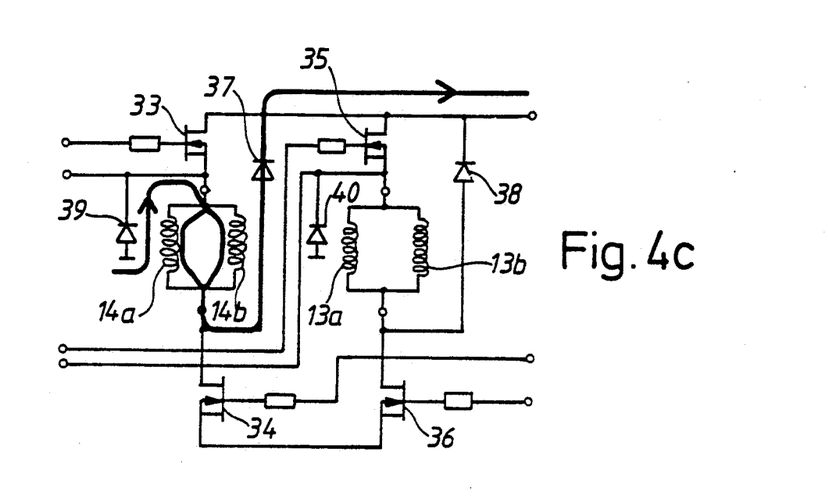

The various blocks in the block diagram of FIG. 3 will now be described more in detail with reference to those figures showing parts of the practical circuit diagram. Accordingly, block 20 corresponds to FIGS. 4a,b,c disclosing the stator pole windings 14a, b, and 13a, b, respectively, and related transistor switches 33, 34 and 35, 36, respectively. FIG. 4a shows the feeding of current into the windings 14a, b by connecting both switches 33 and 34. In dependence of the speed, the transistors 34 and 36, respectively, will be connected and disconnected at a determined frequency of variable duty cycle. As shown in FIG. 4b, during the period of disconnection of the transistor 34 current flows through a diode 37 which, in the usual way, is connected in parallel with the series connection formed by the transistor 33 and the motor windings 14a, b. In the same way, a diode 38 is connected to the transistor 35 and to the windings 13a, b. As illustrated in FIG. 4c, when also transistor 33 is disconnected, a demagnetizing current will flow via a diode 39, the windings 14a, b and the diode 37 back to the supply voltage source. This means that energy is being returned to said source. In the same way as the diode 39, a diode 40 is connected to the windings 13a, b.

Figure 5:
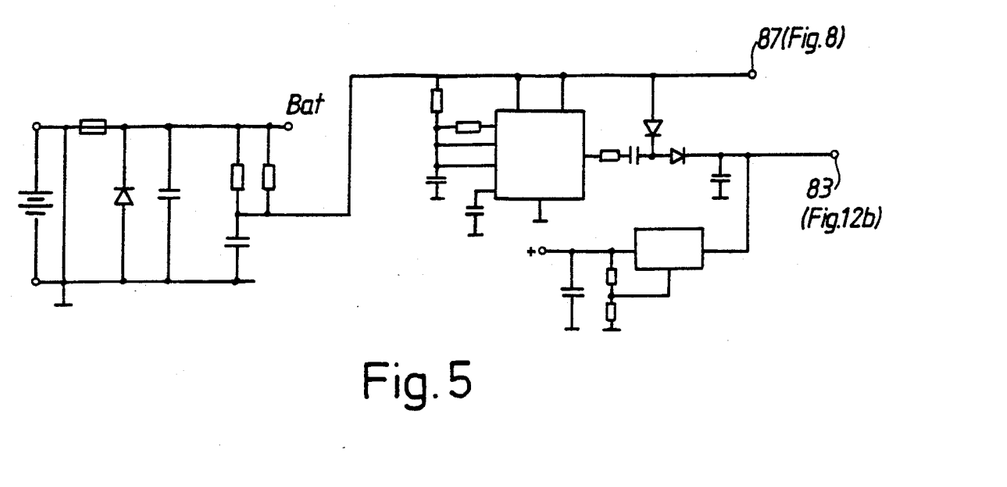
FIG. 5 is a circuit diagram of a power supply unit being part of the control arrangement.

The block 32 of FIG. 3 corresponds to FIG. 5 which, however, will not be commented on in detail. It should be mentioned only that the described motor is intended primarily to be supplied from a battery. The motor can of course also be operated from the mains via a rectifier.

Figure 6:
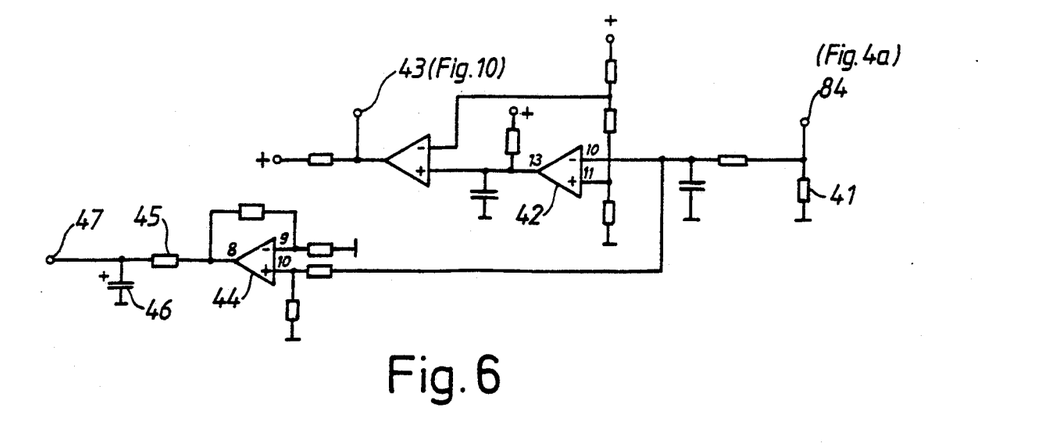
FIG. 6 is a circuit diagram of circuits for current sensing and for generating of a current limit signal, respectively.

The blocks 28, 29 and 30 of FIG. 3 correspond to FIG. 6 in which the motor current is sensed via a series resistor 41. The voltage drop over the resistor is applied to an input of a comparator 42, the other input of which being supplied with a reference voltage corresponding to the desired current limit at which the motor is to be controlled so as to reduce the current. The current limit signal is present on a terminal 43. The circuit of FIG. 6 also generates the current signal in block 30 (FIG. 3) and, hence, the voltage over resistor 41 is led to an amplifier 44 to be amplified and then filtered in a filter comprising a resistor 45 and a capacitor 46. Then, the current signal appears on a terminal 47.

Figure 7:
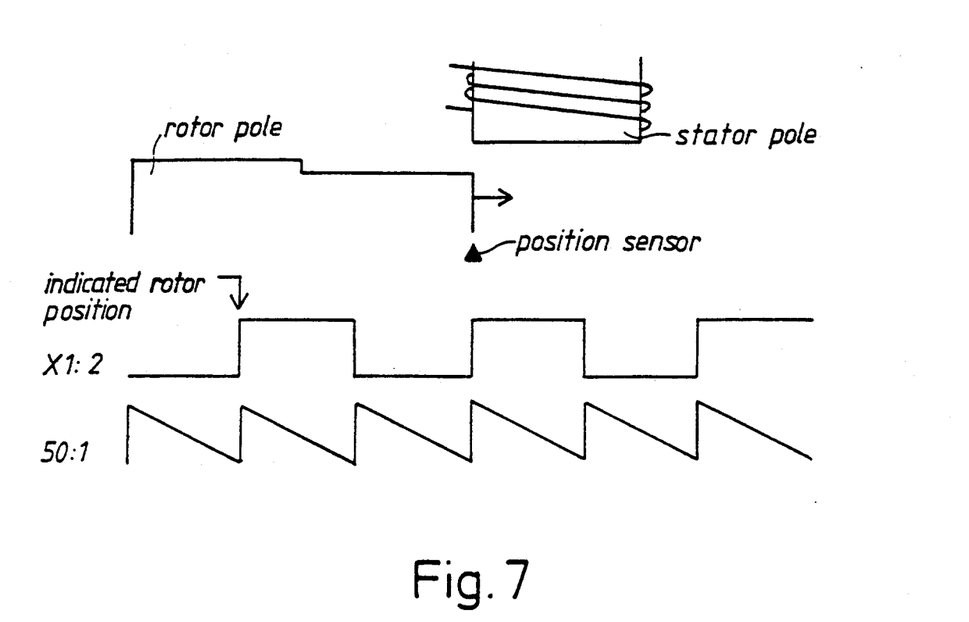
FIG. 7 is a principal circuit diagram showing the generation of a rotor position signal.
Figure 8:
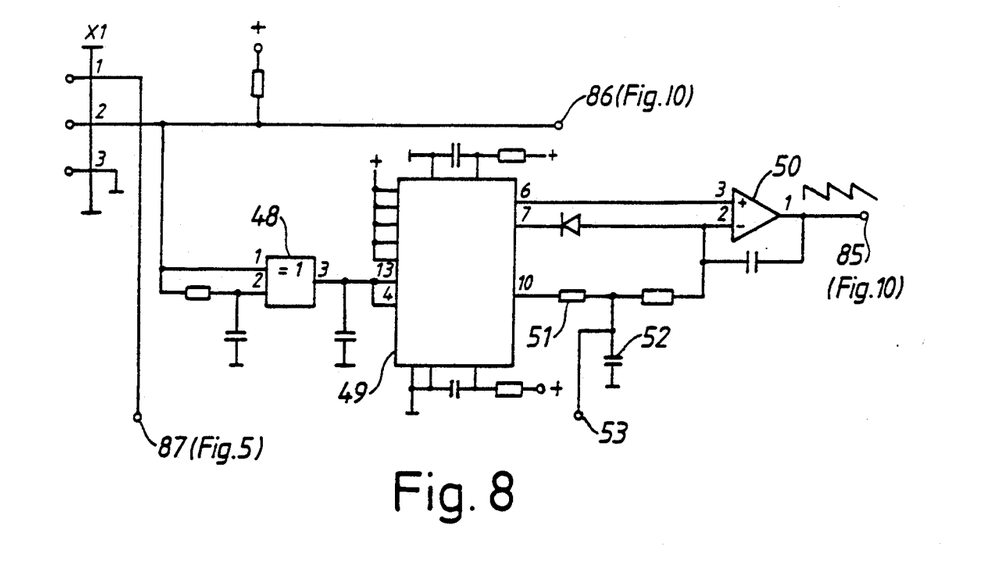
FIG. 8 is a circuit diagram of circuits for generating of a sawtooth voltage based on the rotor position signal.

The block 21 of FIG. 3 corresponds to FIG. 8 which, as regards the function, is to be read together with FIG. 7. The position of the rotor is sensed by a sensor, not described in detail, which is of the magnetic type and referred by X1 in FIG. 8. In FIG. 7 the waveform is shown of the sensor output signal on terminal X1:2 in FIG. 8. The output signal is a rectangular wave having two complete periods per revolution of the rotor, i.e. one complete period per rotor pole. The rotor position shown in FIG. 7, in which the rotor pole is just about to move in over the stator pole, corresponds to the point marked in the diagram for the sensor output signal, showing this signal to go high. The signal remains high until the rotor pole has completely left the area of the stator pole and will then go low until again a rotor pole moves in over the stator pole. The sensor output signal gives information only about the time when a rotor pole reaches a stator pole and when it leaves said pole, respectively, that is at the positive and the negative flanks of the signal. However, it is necessary in every single moment to know exactly the position of the rotor and to this end a sawtooth-shaped signal is created having a period which equals the time period of a positive or negative halfperiod of the sensor signal. This sawtooth-shaped signal is shown in FIG. 7. From a practical point of view this last-mentioned signal is created by means of the components shown in FIG. 8, comprising a flank detector 48, a double monostable flip-flop 49 and an integrator 50. The sensor output signal is applied to the flank detector 48 which emits a short pulse each time a flank, positive or negative, appears in the signal. On the output terminal 49:10 a pulse is present each time the sensor changes its state. This pulse is filtered in a resistor 51 and a capacitor 52 to create a mean value, the speed signal, which appears on a terminal 53 in FIG. 8. The sawtooth signal is generated in the integrator 50, which receives from the output terminal 49:6 of the circuit 49 a positive pulse each time the sensor changes its state. The inverse of this pulse is obtained from the output terminal 49:7 of the circuit. The sawtooth signal appears on the output terminal 50:1 and descends linearly from a high initial value, at a rate proportional to the speed signal. The lowest level of the signal is always the same independent of the speed. When the magnetic sensor again changes its state, the sawtooth signal is forced back to the high starting level. This occurs when the output 49:6 goes high at the same time as the output 49:7 goes low.

Figure 9:
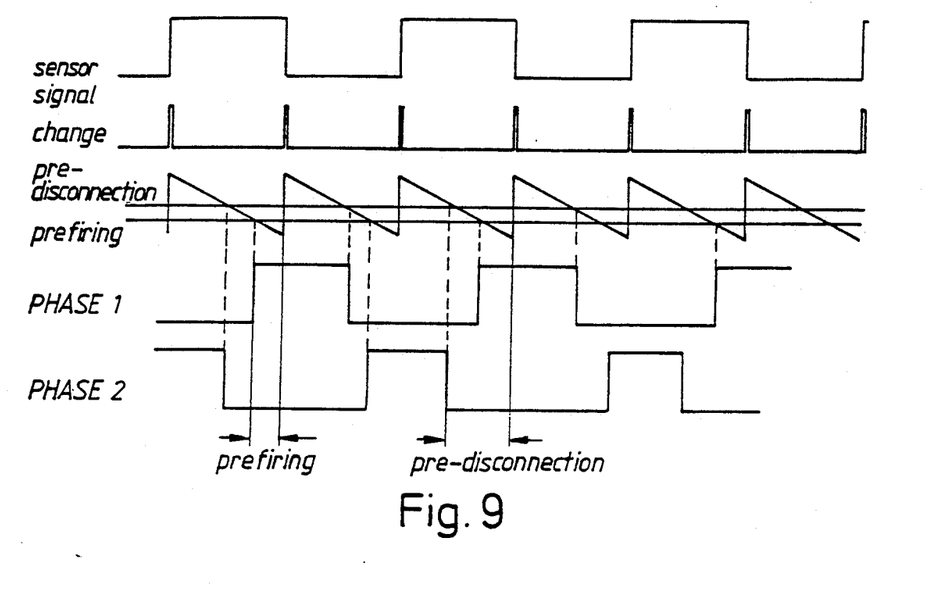
FIG. 9 is a diagram showing interrelated waveforms which illustrate how to achieve pre-activation and -inactivation, respectively, of a pair of stator poles.

In order to obtain optimum performance from the reluctance motor described above, the switching between the two stator pole pairs shall take place before an indication to this effect is given by the magnetic sensor. In the following, the connection-in-advance of the inactivated stator pole pair will be referred to as pre-firing while a disconnection in advance is referred to as pre-disconnection. In FIG. 3 the pre-connection and the pre-disconnection is performed in the block 31 and in the practical circuit diagram the corresponding circuits have been put together in FIG. 10. Concerning the function, reference is also made to the diagram of FIG. 9. From this diagram it is possible to obtain a schematic picture of how to perform the pre-connection and the pre-disconnection, respectively. It is to be mentioned that the pre-connection, only, is controlled by the instantaneous magnitude of the current. The pre-disconnection is fixed, i.e. the disconnection takes place at a predetermined time. The purpose of the pre-disconnection is to solve the problem following the disconnection of a stator pole pair and caused by the magnetic energy not decaying instantly resulting in residual magnetization creating a non-desirable braking torque. At the top of the diagram there is shown the waveform of the signal from the magnetic rotor position sensor. Next below those pulses are shown which are generated upon the change of state of the sensor signal. The third waveform is the sawtooth signal in which two levels have been drawn, one of which corresponding to the desired pre-firing and the other corresponding to the desired pre-disconnection. The two remaining waveforms represent the voltages applied to the windings of the respective stator pole pair, referred to as PHASE 1 and PHASE 2, respectively. Assuming that PHASE 2 is being activated, i.e. the voltage is switched on, from the diagram it can be seen that PHASE 2 is switched off when the sawtooth ramp has reached the level of pre-disconnection and that, thereafter, the voltage of PHASE 1 is switched on when the ramp has reached to level of pre-firing.

Figure 10:
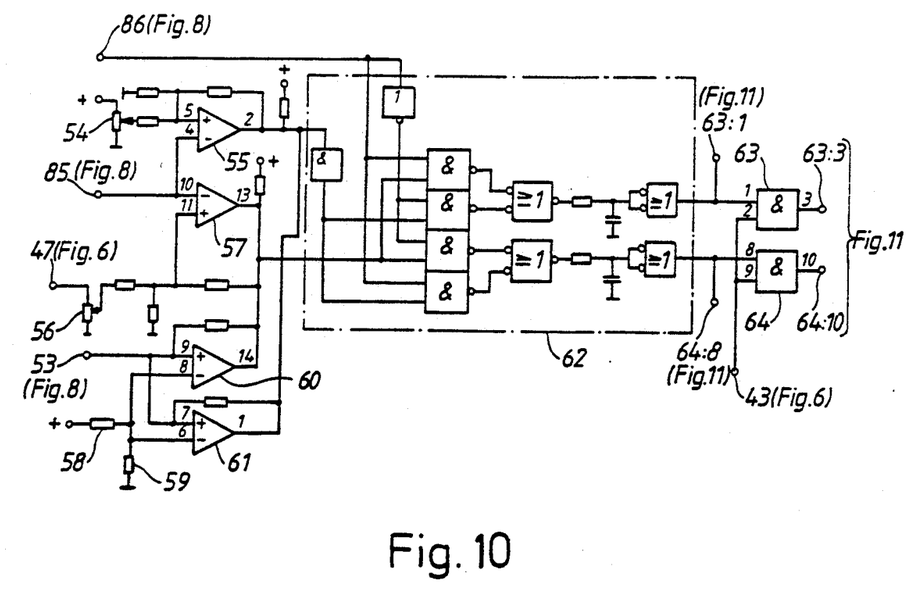
FIG. 10 is a circuit diagram of logics included in the control arrangement and by which, based on different input parameters, drive signals for the motor can be generated.
Figure 11:
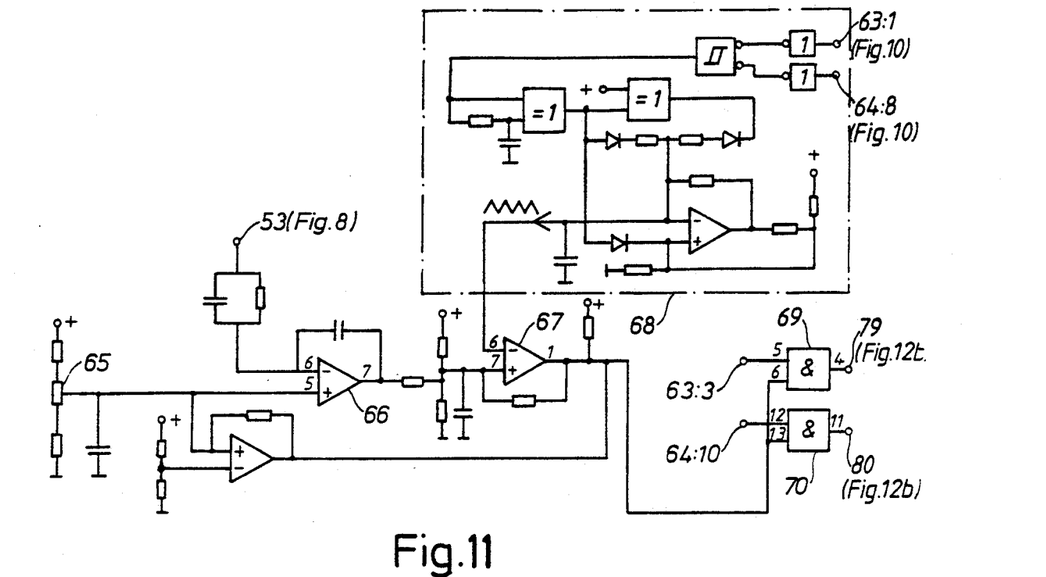
FIG. 11 is a circuit diagram showing control circuits included in the control arrangement for the control of the motor speed.
Figures 12A, 12B:
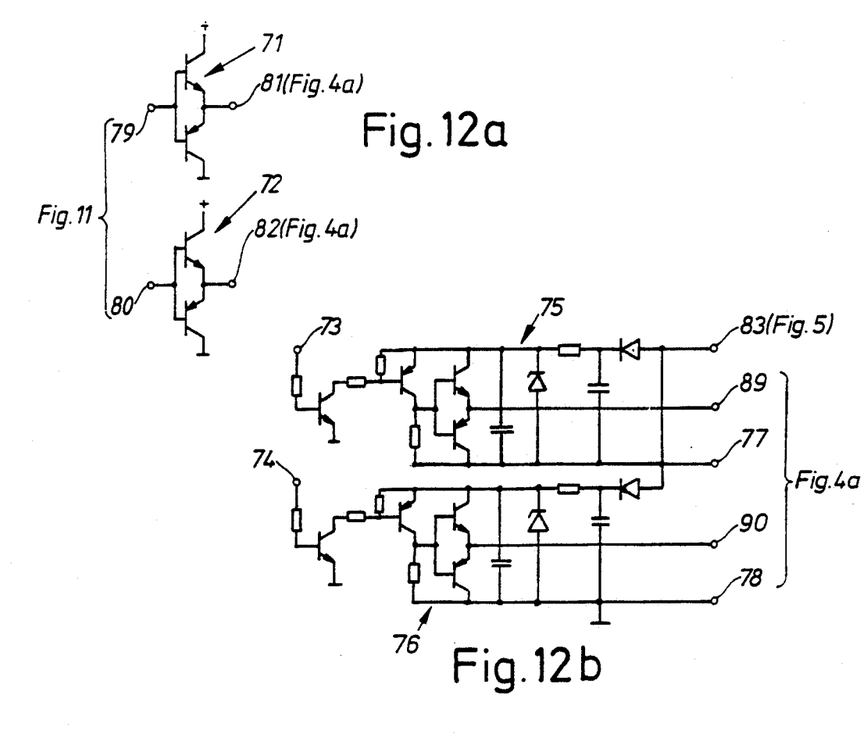
FIG. 12a and 12b show circuit diagrams for the drive output stages of the control arrangement, and, finally.

With reference to FIG. 10 a potentiometer 54 is provided by which the desired angle of pre-disconnection can be set. In a comparator 55 the voltage from the potentiometer is compared with the sawtooth voltage from the output 50:1, FIG. 8, and the result is digitized. The corresponding output signal appears on the output terminal 55:2. The pre-firing angle is dependent on the current signal from the terminal 47 in FIG. 6 which, via potentiometer 56, is conducted to a comparator 57 to be compared with the sawtooth signal, resulting in a digital output signal on the output terminal 57:13. At start and at low speed neither any pre-firing nor any pre-disconnection takes place. By a voltage divider, comprising two resistors 58, 59, the level of the speed signal is determined below which the signals of pre-firing and pre-disconnection, respectively, are to be inhibited. A comparison takes place in two comparators 60 and 61, respectively, and the corresponding signals appear on the outputs 60:14 and 61:1, respectively. In a gate network 62 the signal from the magnetic sensor is gated together with the pre-firing signal and the pre-disconnection signal and in two gates 63 and 64 the current limit signal is added from the terminal 43 in FIG. 6. By that, mainly, the control signals have been finally composed, however the speed control block 25 in FIG. 3 has not yet been treated. To this end, reference is made to FIG. 11 showing a circuit arrangement in which the desired speed is set by a potentiometer 65. In an ID-regulator 66 the potentiometer voltage is compared with the speed signal and the output signal is compared in a comparator 67 with a sawtooth voltage from an oscillator 68. The higher the output from the regulator 66, the greater a duty cycle is given to the output signal (67:1) from the comparator 67. This speed control signal is conducted to two gates 69, 70 to be gated together with the output signals from the gates 63, 64. Then, all control signals that are needed have been produced and the output signals from the gates 69, 70 are conducted to terminals 79, 80 of two drive circuits 71, 72, shown in FIG. 12a,b. The last-mentioned output signals are intended, via output terminals 81, 84, to control the transistors 34 and 36, respectively, in FIG. 4a. Control signals for the transistors 33 and 35 are derived from the gate network 62 and appear on the inputs 63:1 and 64:8, respectively. The signals are conducted to the terminals 74 and 73, respectively, in FIG. 12b. These terminals are inputs to drive circuits 75, 76 intended to generate on output terminals 89, 90 drive signals for the transistors 34 and 36 in FIG. 4a. Via other terminals 77, 78 the drive circuits are connected to the circuits shown in FIG. 4a and via a terminal 83 said circuits are connected to the power supply unit (FIG. 5).

Figure 13:
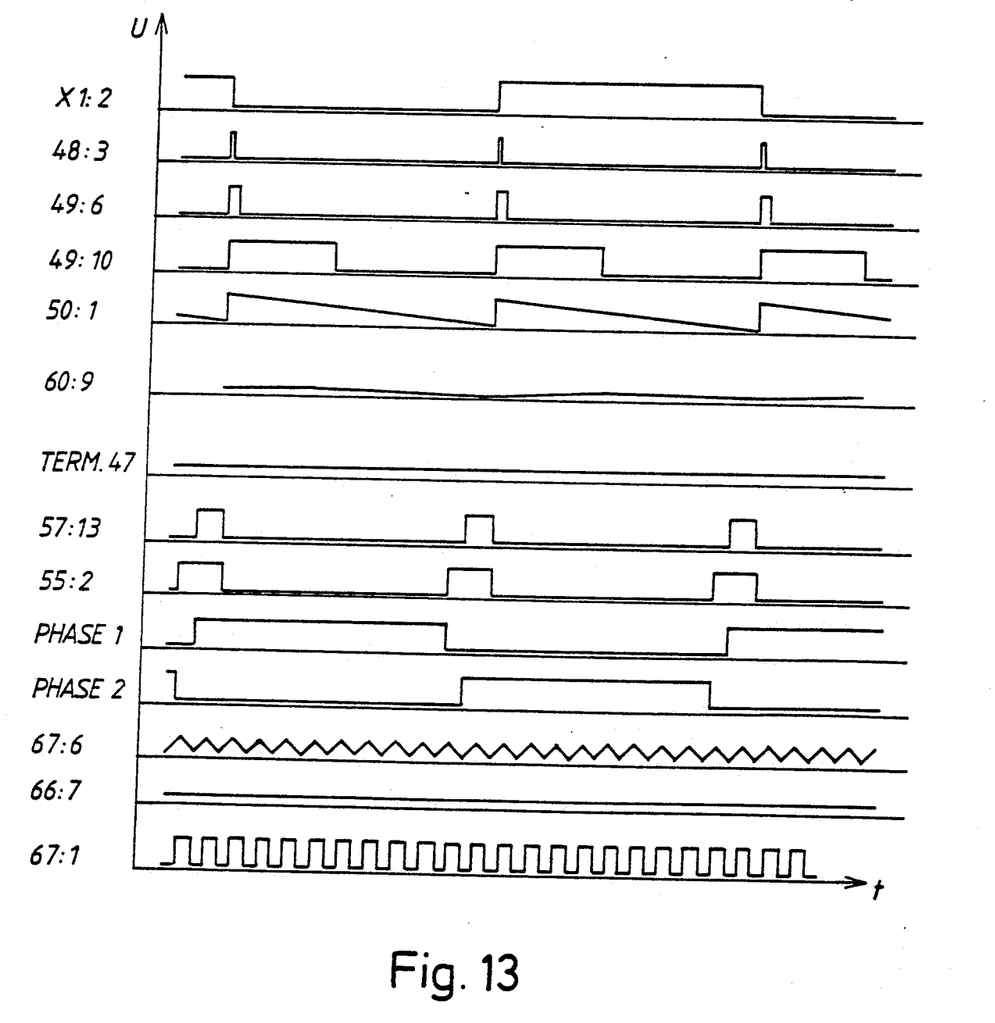
FIG. 13 is a timing chart showing the waveforms of different signals appearing in the control arrangement.

As made clear from the above, a review only has been given of the practical circuit diagram shown in the drawings. Essential function blocks have been discussed, however, commonly used circuits have not been described in detail. For the purpose of improving the understanding of the function of the motor control arrangement described, reference is made to FIG. 13 showing a timing diagram for various signals appearing in the different function blocks of the control arrangement. In the diagram the points of appearance of the different signals in the circuit diagram have been indicated. Starting from the top, there is shown the signal from the rotor positon sensor. Then follows the signal from the flank detector 48. The two following waveforms represent two output signals from the double flip-flop 49. Then follow the sawtooth signal from the integrator 50 and the speed signal i.a. appearing on the input 60:9 of the comparator 60. The waveform of the means current of the motor follows next and then the signals for pre-firing and pre-disconnection. The waveforms for the final control signals from the control logic are the next to be shown and they are referred to as PHASE 1 and PHASE 2, respectively. Finally, the oscillator output signal at the output 67:6, the output signal at the output 66:7 of the regulator 66 and the speed control signal at the output 67:1 of the comparator 47 are shown.

I claim:

1. A control arrangement for a reluctance motor, comprising stator poles, (11a,b;12a;b) having windings (13a,b;14a,b) and cooperating in pairs, and a rotor (15) made of soft magnetic material and having at least two poles (16a,b;17a,b) disposed diametrically opposite each other, said motor being controlled by a sensor (X1) the output signal of which comprises a train of rectangular pulses and the front flank of each pulse coincides with the position of the rotor pole where it is about to move in over a stator pole whereas the rear flank of said pulse coincides with the position where the rotor pole leaves the stator pole, electronic switching means (33,34;35,36)

being provided which in dependence on said front flank applies voltage to the windings of one of the stator pole pairs (12a,b) and in dependence on said rear flank disconnects the voltage from said stator pole pair (12a,b) and applies voltage to the stator pole pair to follow (11a,b), wherein first means (28,30) are provided which generate a parameter which is a function of the motor current and second means (31) are provided which generate, in dependence on said parameter, a signal which causes a setting of the point of time, prior to the point of time corresponding to a flank of the sensor output signal, at which voltage is to be applied to the windings of the respective stator pole pair, said setting being made more prior as the current increases.

2. An arrangement according to claim 1, wherein the flanks of the sensor output signal control a sawtooth generator (50) which generates a falling ramp, the slope of which corresponds to the speed of the motor, first comparing means being provided which compare the falling ramp with a voltage level determined by the current dependent parameter for generating the signal which causes said setting of the point of time at which voltage is to be applied to the respective stator pole pair.

3. An arrangement according to claim 2, wherein the motor comprises a stator (10) having four poles (11a,b;-12a,b) disposed to form a cross, and a rotor (15) having two poles (16a,b;17a,b) which are disposed diametrically opposite each other, each rotor pole having a first part (16a;17a) of a peripheral extension which corresponds to an extension of the stator pole pairs and a second part (16b;17b) of an extension which, with said first part completely coinciding with the stator pole (12a,b), fills the space to the adjacent pole (11a,b) of the other stator pole pair, as seen in the direction of rotation, said second part (16b,17b) having a greater air gap to the stator poles than said first part.

4. An arrangement according to any of the preceding claims, wherein means (58,59,60) are provided to inhibit said signals for the setting of the point of time of application of voltage to the windings at start of the motor and at low speeds.

* * * * *